Nov. 20, 1956  B. M. PETERS  2,771,145
FOLDABLE THREE-WHEEL POWER DRIVEN VEHICLE
Filed Aug. 30, 1954  2 Sheets-Sheet 2
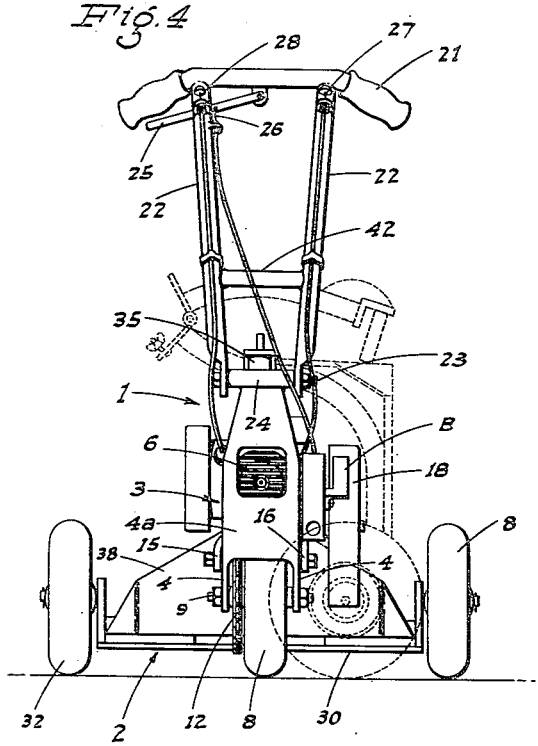
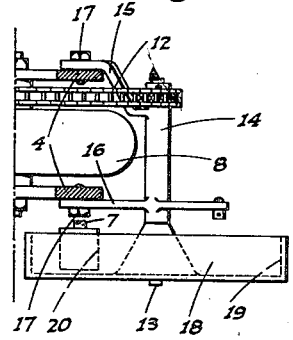
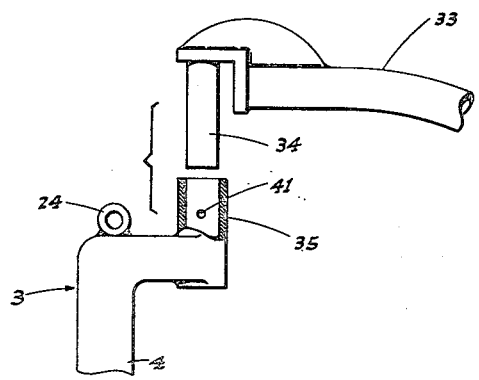
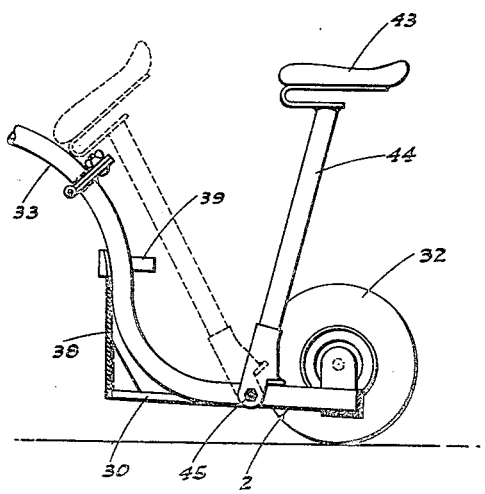
INVENTOR
Byron M. Peters
BY Webster & Webster
ATTORNEYS.

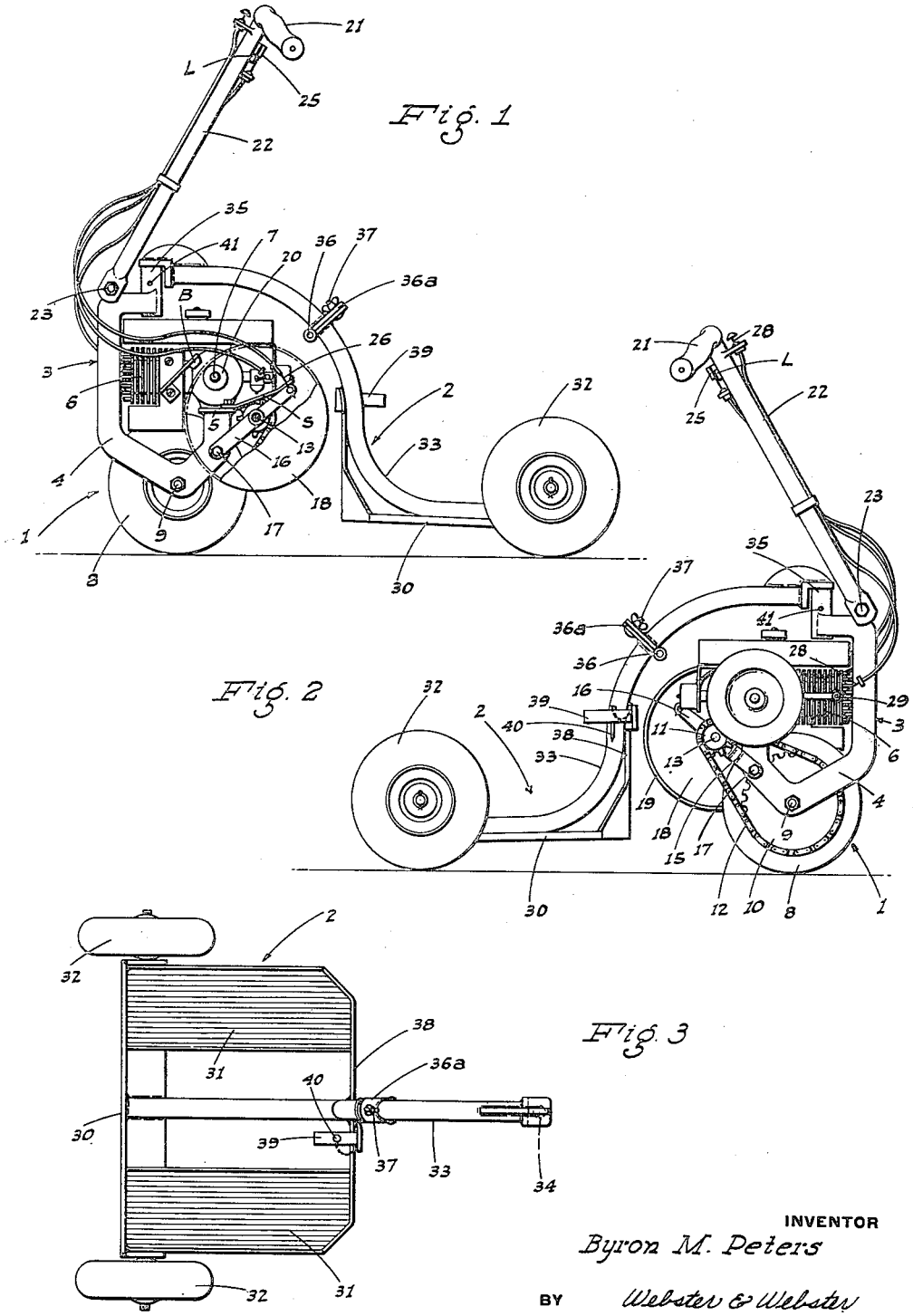

United States Patent Office 2,771,145
Patented Nov. 20, 1956

2,771,145

FOLDABLE THREE-WHEEL POWER DRIVEN VEHICLE

Byron M. Peters, Lathrop, Calif.

Application August 30, 1954, Serial No. 453,005

4 Claims. (Cl. 180—26)

This invention relates to power driven vehicles, and particularly to one of a relatively small three-wheel type; a major object of the invention being to provide a single-occupant vehicle of this general type particularly designed for the use of those who—in the carrying on of their activities—ordinarily have to walk considerable distances, such as mailmen, certain types of farm, factory, or warehouse workers (such as foremen or supervisors), golfers, and the like.

Another object of the invention is to provide a vehicle for the purpose which includes a front power unit having only a single ground engaging wheel, and a rear ground-supported trailer on which the rider may stand or be seated, and which trailer is pivotally connected to the front unit for steering movement relative to each other.

A further object of the invention is to so connect the trailer to the power unit that the two may be readily disengaged or separated from each other so that the power unit, which is self-contained, may be used in connection with other trailers, such as ones having load-carrying facilities or ground working implements included therewith. To this end the steering means for the power unit, and the various control devices for the engine thereof, are all carried by said power unit and have no physical connection with the trailer.

A still further object of the invention is to so arrange the trailer that—in addition to being readily detachable from the power unit—it may be separately connected thereto in side by side, folded relation for convenient shipping or carrying of the vehicle; the total weight of the vehicle being such that a man can lift and carry the folded vehicle clear of the ground.

An additional object of the invention is to provide a three-wheel power driven vehicle which is designed for ease and economy of manufacture.

It is also an object of the invention to provide a practical, reliable, and durable three-wheel power driven vehicle, and yet one which will be exceedingly effective for the purpose for which it is designed.

These objects are accomplished by means of such structure and relative arrangement of parts as will fully appear by a perusal of the following specification and claims.

In the drawings:

In Fig. 1 is a side elevation of the vehicle, with the initial drive wheel partly broken away.

Fig. 2 is a similar view, but looking at the opposite side of the vehicle.

Fig. 3 is a plan view of the trailer, detached.

Fig. 4 is a front end view of the vehicle, showing the trailer in a folded position in dotted lines.

Fig. 5 is a fragmentary enlarged plan view of the drive means for the ground-engaging wheel of the power unit.

Fig. 6 is a fragmentary elevation, partly in section, showing the detachable connecting means between the power unit and trailer.

Fig. 7 is a fragmentary sectional elevation of the trailer, showing a jump-seat as mounted thereon.

Referring now more particularly to the drawings, and to the characters of reference marked thereon, the vehicle comprises essentially a front single-wheel drive unit 1, and a rear two-wheel trailer unit 2. The front drive unit 1 comprises a supporting frame, indicated generally at 3, and which includes substantially U-shaped, transversely spaced, side members 4 connected at their forward end by a vertical cross-web 4a (see Fig. 4), and at their rear end by a horizontal pad 5 (see Fig. 1). This pad forms a support for the crankcase of a horizontally disposed internal combustion engine 6 of a standard single-cylinder type, and disposed so that its cylinder faces forwardly, while its crank shaft 7 extends transversely.

A ground engaging wheel 8 supports the unit 1, being journaled between the frame members 4—under the engine 6—on a cross axle 9. A sprocket wheel 10, fixed with the wheel 8 on one side thereof, is alined with a sprocket pinion 11 disposed rearwardly of and below the crank shaft 7; the sprockets being connected by an endless chain 12.

The pinion 11 is fixed on one end of a shaft 13 journaled in a sleeve 14 which is rigid with end arms 15 and 16 (see Fig. 5 particularly) which, at their lower end, overlap—and are pivoted on—the frame members 4, as at 17.

Fixed on the other end of the shaft 13, beyond the arm 16, is a wheel 18 having a rim flange 19 overhanging and arranged to be engaged on its inner face by a friction drive roller 20 fixed on the adjacent end of the engine shaft 7.

The arms 15 and 16 slope to the rear from their lower pivoted end, as shown, and the roller 20 is disposed in a plane substantially at right angles to the arms, so that the weight of the arms and parts supported thereby, aided by a spring S engaging the arm 16, acts to maintain the wheel flange 19 in driving contact with the roller 20. Disengagement can be effected by pulling up on the arms, and this is done by means associated with, and operable from, a transverse steering bicycle-type handle bar 21. This bar is rigid, with spaced depending posts 22 which are swivelly and adjustably clamped at their lower end, by a bolt 23, against the ends of a transverse sleeve 24 fixed on the front upper end of the frame 3.

A transverse hand lever 25 is pivoted at one end on the under side of the handle bar 21, as shown in Fig. 4, and a housed pull wire 26 extends downwardly from a connection with lever 25 intermediate its ends to a connection with the rear end extension of the arm 16. The lever is positioned so that it may be readily lifted up, in order to release the wheel 18 from driving engagement with the roller 20, by a hand of the operator riding the vehicle and manipulating the steering handle bar 21.

The engine throttle is also controlled by a push-pull wire 27 terminating adjacent the bar 21, while another push-pull wire 28, also terminating adjacent the bar, controls the actuating of a valve, indicated at 29, and which facilitates the starting of the engine; such valve and its specific function being fully set forth in my copending application, Serial No. 452,819, filed August 30, 1954 now Patent No. 2,742,380.

When the lever 25 is pulled up slightly, the drive wheel 18 is disengaged from the drive roller 20, and a further upward movement of said lever causes the wheel 18 to then contact a fixed brake element B; bringing the vehicle to a stop, with the engine still running. The lever can then be engaged with a suitable retaining stop or latch L mounted on the handle bar 21.

The trailer 2 which cooperates with the unit 1, and when connected thereto holds the same in an upright operative condition, comprises a generally horizontal base frame 30 which supports foot platforms 31. The frame 30, at its rear end, supports a pair of transversely spaced wheels 32; the platforms being below the center of the wheels.

The frame 30, centrally of its width, is rigidly connected to the lower end portion of a tubular upstanding tongue unit 33 of generally goose-neck or S form, and whose upper forward end portion overhangs the engine 6 and terminates in a depending kingpin 34, as shown in Fig. 6. This kingpin removably and turnably seats in a vertical sleeve or socket 35 which is fixed on, or formed with, the frame 3 at the top thereof just rearwardly of the handle-post mounting sleeve 24, but ahead of the vertical plane of the wheel axle 9.

The S-shaped tongue 33 is formed of upper and lower sections connected by a leaf hinge 36 for downward folding movement; the leaves 36a of the hinge being normally folded and in engagement with each other, as shown in Figs. 1 and 2, and the adjacent ends of the tongue sections being rigidly connected to the leaves. A detachable coupling bolt 37 connects the leaves so that they cannot normally unfold or separate, although the normal pressure of the weight on the vehicle tends to prevent such unfolding.

The frame 30 at the front is provided with an upstanding portion 38 on which, to one side of the tongue 33, a normally horizontal, rearwardly projecting pin 39 is rigidly secured; said pin fitting in the socket 35 and being then held against turning or removal by a cross pin 40 passing through opposed holes 41 in the socket.

The pin 39 is positioned relative to the other parts of the trailer and the various parts of the power unit 1 so that when the upper tongue section is disengaged from the socket 35 and folded down, said pin 39—when engaged with the socket—will maintain the trailer adjacent one side of the power unit and at right angles to its normal position, as indicated by dotted lines in Fig. 4, and in such compact and balanced side relationship to the power unit that the entire vehicle may then be lifted and carried by a man grasping a crossbar 42 which connects the handle posts 22 intermediate their ends.

The trailer, as above described, is designed so that the occupant will stand thereon; the handle 21 being positioned by adjustment of the posts about the sleeve 24—so as to be convenient to the hands of such occupant, whereby he may control the steering vehicle as well as the operation of the engine from his standing position on the trailer.

For those who wish to assume a seated position on the trailer, a seat 43 may be provided. This seat is mounted on the upper end of a post 44, which is pivoted—as at 45—on the lower rear portion of the central trailer tongue 33 for forward folding movement from a normal rearwardly sloping position, as shown in Fig. 7, and in which position the seat overhangs the transverse plane of the wheels 32.

The engine is started by leaving the drive roller 20 in contact with wheel 13 and advancing the vehicle along the ground by foot or arm propulsion until the engine "catches" and starts. Thereafter, the driver—standing or seated on the trailer—may guide the vehicle in any direction selected, and when desiring to stop need only manipulate the lever 25 in the manner previously described.

The pivotal point of the trailer with the front power unit being ahead of the single drive and steering wheel, any tendency for the vehicle to upset when making a sharp or sudden turn is practically eliminated.

The base frame 30 of the trailer, and the foot platforms 31 as well, have an upward slope to their forward end, as shown, whereby to provide a semi-sled effect which aids in passage over obstructions encountered during operation of the vehicle.

The foot platforms may, if desired, be fitted with cushion mats upon which the operator stands.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A self-propelled vehicle comprising a front power unit which includes a central ground-engaging drive wheel, a trailer behind the power unit and having a pair of transversely spaced ground engaging wheels symmetrically disposed relative to the first named wheel when the power unit and trailer are longitudinally alined, means on the trailer to support a driver, means connecting the trailer and power unit for relative rotation about a vertical axis, and a steering handle structure on the power unit arranged for actuation by the driver; said connection means comprising a vertical socket on the power unit and a pin on the front end of the trailer detachably seated in the socket and then maintaining the trailer and power unit in cooperating relationship; and another pin fixed on the trailer and engageable in said socket when the first named pin is withdrawn therefrom, said other pin being positioned so that when engaged in the socket, the trailer will be disposed alongside and close to the power unit with the axial line of the trailer wheels extending lengthwise of the power unit.

2. A self-propelled vehicle comprising a front power unit and a trailer, the unit including a frame comprising transversely spaced generally U-shaped side arms having upstanding relatively tall and short front and rear portions, respectively, a cross web connecting the front portions at their forward edge, and substantially from top to bottom thereof, and a substantially horizontal cross pad connecting the rear arm portions at their upper end; the trailer including a forwardly projecting rigid tongue pivotally supported at its forward end from the upper end of the front portion of the frame for rotation about a vertical axis; a single ground-engaging drive wheel disposed between and supported by the frame adjacent the lower end of the side arms thereof and back from the cross web, and a horizontally disposed gas engine having a crank case mounted on the pad, the engine extending forwardly from the pad above the wheel; there being drive connections between the engine and wheel.

3. A vehicle comprising a front power unit and a wheeled driver-supporting trailer; the power unit comprising a rigid frame which includes transversely spaced members formed to provide a relatively tall portion at the front end of the frame, a ground-engaging wheel disposed between and supported on said members, and an engine supported by the frame and operatively connected to the wheel, said engine being above the wheel but below the top of said front end portion of the frame; the trailer including a rigid forwardly projecting tongue overhanging the engine and the top of said forward portion of the frame in clearance relation, a vertical-axis pivot connection between the forward end of the tongue and the forward frame portion of the top thereof, a handle structure upstanding from the front end of the frame and including a pair of arms spaced apart at their lower end, and a transverse boss on top of the frame at said front end thereof ahead of said pivot connection and closely straddled by the arms at their lower end, and a clamping bolt through the boss and arms.

4. In a self-propelled vehicle which includes a front power unit and a wheeled driver-supporting trailer swivelly coupled to the unit for relative rotation about a vertical axis; the unit comprising a frame having spaced side members, a transverse-axis ground-engaging drive wheel disposed between and supported on the members, an engine mounted on the frame above the wheel and including a transverse-axis drive pulley disposed to one side of the wheel, another transverse-axis wheel having a peripheral flange overhanging and normally engaging the pulley, a pair of connected arms pivoted on the frame members straddling the last named wheel and on which the latter is pivoted at a point clear of the ground engaging wheel and below and rearwardly of the axis of the pulley in a position such that downward swinging of the arms to a predetermined position brings the flange into driving contact with the pulley and upward swinging of the arms from such position breaks such contact, a driving connection between the ground-engaging wheel and said other wheel, and operator-controlled means connected to one of said arms to thus swing the same upwardly.

References Cited in the file of this patent

UNITED STATES PATENTS

| | | |
|---|---|---|
| 1,044,580 | Sailer | Nov. 19, 1912 |
| 1,455,720 | Dunkley | May 15, 1923 |
| 2,111,691 | Salsbury | Mar. 22, 1938 |
| 2,354,576 | Clark | July 25, 1944 |
| 2,525,877 | Dolphin | Oct. 17, 1950 |
| 2,649,162 | Wooldridge et al. | Aug. 18, 1953 |
| 2,705,156 | Torre | Mar. 29, 1955 |

FOREIGN PATENTS

| | | |
|---|---|---|
| 113,030 | Austria | Apr. 25, 1929 |
| 810,112 | Germany | Aug. 6, 1951 |
| 10,272 | Great Britain | 1905 |
| 3,277 | Great Britain | 1909 |